(12) United States Patent
Inoue Sardenberg

(10) Patent No.: US 12,026,680 B2
(45) Date of Patent: Jul. 2, 2024

(54) SYSTEM AND METHOD FOR INFERRING MACHINE FAILURE, ESTIMATING WHEN THE MACHINE WILL BE REPAIRED, AND COMPUTING AN OPTIMAL SOLUTION

(71) Applicant: Caterpillar Inc., Peoria, IL (US)

(72) Inventor: Lucas Inoue Sardenberg, Oak Park, IL (US)

(73) Assignee: Caterpillar Inc., Peoria, IL (US)

( * ) Notice: Subject to any disclaimer, the term of this patent is extended or adjusted under 35 U.S.C. 154(b) by 156 days.

(21) Appl. No.: 17/464,411

(22) Filed: Sep. 1, 2021

(65) Prior Publication Data
US 2023/0068328 A1  Mar. 2, 2023

(51) Int. Cl.
*G06Q 10/20* (2023.01)
*G06Q 10/0631* (2023.01)

(52) U.S. Cl.
CPC ....... *G06Q 10/20* (2013.01); *G06Q 10/06313* (2013.01)

(58) Field of Classification Search
None
See application file for complete search history.

(56) References Cited

U.S. PATENT DOCUMENTS

| | | | | |
|---|---|---|---|---|
| 6,295,510 B1 * | 9/2001 | Discenzo | .................. | H02P 9/02 702/183 |
| 6,434,512 B1 * | 8/2002 | Discenzo | .............. | F16C 41/008 702/184 |
| 9,438,648 B2 * | 9/2016 | Asenjo | .................. | H04L 67/535 |
| 9,454,855 B2 * | 9/2016 | Ahn | ........................ | G07C 5/008 |
| 10,581,974 B2 * | 3/2020 | Sustaeta | ............. | G05B 13/0265 |
| 10,679,226 B1 * | 6/2020 | Duckworth | ............ | G06Q 10/30 |
| 2009/0063305 A1 * | 3/2009 | Kreifels | ............... | G06Q 10/087 705/28 |

(Continued)

FOREIGN PATENT DOCUMENTS

| | | | |
|---|---|---|---|
| CN | 109472372 A | * | 3/2019 |
| CN | 109508790 A | * | 3/2019 |
| EP | 3621069 | | 3/2020 |

OTHER PUBLICATIONS

Zweben et al, Scheduling and Rescheduling with Iterative Repair, IIE Transactions on Systems, V23, N6, Dec. 1993 https://ieeexplore.ieee.org/abstract/document/257756 (Year: 1993).*

(Continued)

*Primary Examiner* — Octavian Rotaru

(57) ABSTRACT

Techniques are provided that may include receiving sensor data from one or more machine sensors, the sensor data indicating machine failure. Informational data about current repair technician backlog, shop availability backlog, and parts availability are retrieved and inputted to a machine learning model for computing an estimated time to when the failed machine will be repaired. Customer data and dealer site data are retrieved and an estimated financial impact from a potential loaner machine is computed. The various computed and retrieved data are inputted to a decision tree algorithm, which computes an optimal solution for maintaining customer productivity. The network-accessible dealer site is notified of the optimal solution, which is intended for the customer.

20 Claims, 5 Drawing Sheets

(56) References Cited

U.S. PATENT DOCUMENTS

| | | | | |
|---|---|---|---|---|
| 2010/0057594 | A1* | 3/2010 | Syme | G06Q 10/08 |
| | | | | 705/29 |
| 2012/0030067 | A1* | 2/2012 | Pothukuchi | G06Q 10/087 |
| | | | | 705/28 |
| 2012/0323615 | A1* | 12/2012 | Johnson | G06Q 10/06311 |
| | | | | 705/7.11 |
| 2014/0278711 | A1* | 9/2014 | Fuller | G06Q 10/06315 |
| | | | | 705/7.25 |
| 2015/0220875 | A1* | 8/2015 | Tamaki | G06Q 10/20 |
| | | | | 705/7.23 |
| 2017/0144671 | A1* | 5/2017 | Memani | G06Q 40/12 |
| 2017/0349058 | A1* | 12/2017 | Bernier | H02J 13/00004 |
| 2018/0046961 | A1* | 2/2018 | Tulabandhula | G06N 7/01 |
| 2018/0107895 | A1* | 4/2018 | Beller | G06Q 30/0625 |
| 2019/0213605 | A1* | 7/2019 | Patel | G07C 5/0808 |
| 2019/0289826 | A1* | 9/2019 | Tippery | G06N 20/20 |
| 2020/0075027 | A1* | 3/2020 | Arantes | G06Q 50/40 |
| 2020/0134716 | A1* | 4/2020 | Lahrichi | G06N 5/01 |
| 2020/0143528 | A1* | 5/2020 | Kulkarni | G06T 5/73 |
| 2020/0160460 | A1* | 5/2020 | Fricke | G06N 20/00 |
| 2020/0210894 | A1* | 7/2020 | Mimura | G06N 5/02 |
| 2020/0285970 | A1* | 9/2020 | Dagley | G06Q 10/20 |
| 2020/0410163 | A1* | 12/2020 | Shah | G06Q 10/20 |
| 2021/0042708 | A1* | 2/2021 | Gardiner | G06Q 10/20 |
| 2021/0192388 | A1* | 6/2021 | Cunningham | F17D 3/05 |
| 2022/0188746 | A1* | 6/2022 | Tennent | G07C 5/008 |
| 2022/0252411 | A1* | 8/2022 | Gardiner | G06Q 10/025 |
| 2022/0366445 | A1* | 11/2022 | Lerner | G06Q 50/40 |

OTHER PUBLICATIONS

CN 109472372 A translated (Year: 2019).*
CN 109508790 A translated (Year: 2019).*
Written Opinion and International Search Report for Int'l. Patent Appln. No. PCT/US2022/041031, mailed Nov. 18, 2022 (11 pgs).

* cited by examiner

SYSTEM AND METHOD FOR INFERRING MACHINE FAILURE, ESTIMATING WHEN THE MACHINE WILL BE REPAIRED, AND COMPUTING AN OPTIMAL SOLUTION

TECHNICAL FIELD

The present disclosure relates to industrial machine maintenance, and more specifically, to systems and methods for collecting data from sensors and other sources and, in response to an industrial machine failure, calculating an optimal solution in real-time using the collected data.

BACKGROUND

Unexpected industrial machine failures at a customer or jobsite cost customer time and money. Presently, the process from calling and reporting the industrial machine issue to the dealer finding a solution usually relies on several calls, checks, and other activities that are very inefficient and slow down the response time to customers, representing potential lost revenue and loyalty.

For example, U.S. Pat. No. 9,438,648, Industrial Data Analytics in a Cloud Platform (Sep. 6, 2016) to J. Asenjo, et al. (hereinafter "Asenjo"), describes a technique in which cloud-aware industrial devices feed sets of data to a cloud-based data analyzer that executes as a service in a cloud platform. In addition to industrial data generated or collected by the industrial devices, the devices can provide device profile information to the cloud-based analyzer that identifies the device and relevant configuration information. The industrial devices can also provide customer data identifying an owner of the industrial devices, contact information for the owner, active service contracts, etc. The cloud-based data analyzer leverages this information to perform a variety of custom analytics on the data and generate reports or notifications catered to the particular industrial assets' optimal performance and business goals of the owner's industrial enterprise, as well as perform real-time decision making and control.

Asenjo is directed to industrial assets' optimal performance and business goals of the owner's industrial enterprise, as well as perform real-time decision making and control. The disclosure of Asenjo lacks, among other things, addressing unexpected industrial machine repairs and does not include discussing processing specific data such as processing data regarding the dealerships of industrial machines for example.

SUMMARY

In some embodiments, a method for minimizing customer and jobsite downtime due to an unexpected machine repair can include receiving, at a server processor and from a machine at a customer jobsite of a customer, sensor data from one or more machine sensors, wherein the sensor data indicates a machine failure; retrieving, at a server processor and from a network-accessible dealer site of a dealer associated with the customer, informational data about current repair technician backlog, shop availability backlog, and parts availability; inputting, by a server processor, the received sensor data and the retrieved informational data to a machine learning model for computing an estimated time to when the failed machine will be repaired; retrieving, at a server processor and from a customer database, customer data about customer loyalty and importance; retrieving, at a server processor and from the network-accessible dealer site, informational data about dealer rental fleet availability for a model that is the same as or similar to the machine and informational data about loaner machines availability; computing, by a server processor, an estimated financial impact from a potential loaner machine, based on availability of said potential loaner machine; determining, by a server processor, a distance from a location of the potential loaner machine to the customer jobsite; inputting the computed estimated time to when the failed machine will be repaired, the retrieved customer data about customer loyalty and importance, the retrieved informational data about dealer rental fleet availability for a model that is the same as or similar to the machine and informational data about loaner machines availability, the computed estimated financial impact, and the distance from a location of the potential loaner machine to the customer jobsite to a decision tree algorithm at the server for computing an optimal solution for maintaining customer productivity; computing, by the decision tree algorithm, the optimal solution for maintaining customer productivity; and notifying, by a server processor, an entity at the network-accessible dealer site of the optimal solution, wherein the optimal solution is intended for the customer.

In some embodiments, a system for minimizing customer and jobsite downtime due to an unexpected machine repair can include one or more processors and one or more memory devices having instructions stored thereon, which when executed by the one or more processors the instructions cause the one or more processors to: receive, from a machine at a customer jobsite of a customer, sensor data from one or more machine sensors, wherein the sensor data indicates a machine failure; retrieve, from a network-accessible dealer site of a dealer associated with the customer, informational data about current repair technician backlog, shop availability backlog, and parts availability; input the received sensor data and the retrieved informational data to a machine learning model for computing an estimated time to when the failed machine will be repaired; retrieve, from a customer database, customer data about customer loyalty and importance; retrieve, from the network-accessible dealer site, informational data about dealer rental fleet availability for a model that is the same as or similar to the machine and informational data about loaner machines availability; compute an estimated financial impact from a potential loaner machine, based on availability of said potential loaner machine; determine a distance from a location of the potential loaner machine to the customer jobsite; input the computed estimated time to when the failed machine will be repaired, the retrieved customer data about customer loyalty and importance, the retrieved informational data about dealer rental fleet availability for a model that is the same as or similar to the machine and informational data about loaner machines availability, the computed estimated financial impact, and the distance from a location of the potential loaner machine to the customer jobsite to a decision tree algorithm at the server for computing an optimal solution for maintaining customer productivity; compute, by the decision tree algorithm, the optimal solution for maintaining customer productivity; and notify an entity at the network-accessible dealer site of the optimal solution, wherein the optimal solution is intended for the customer.

In some embodiments, one or more non-transitory computer-readable media storing computer-executable instructions that, when executed by one or more processors, cause the one or more processors to perform operations. The operations can include receiving, from a machine at a customer jobsite of a customer, sensor data from one or more machine sensors, wherein the sensor data indicates a machine failure; retrieving, from a network-accessible dealer site of a dealer associated with the customer, informational data about current repair technician backlog, shop availability backlog, and parts availability; inputting the received sensor data and the retrieved informational data to a machine learning model for computing an estimated time to when the failed machine will be repaired; retrieving, from a customer database, customer data about customer loyalty and importance; retrieving, from the network-accessible dealer site, informational data about dealer rental fleet availability for a model that is the same as or similar to the machine and informational data about loaner machines availability; computing an estimated financial impact from a potential loaner machine, based on availability of said potential loaner machine; determining a distance from a location of the potential loaner machine to the customer jobsite; inputting the computed estimated time to when the failed machine will be repaired, the retrieved customer data about customer loyalty and importance, the retrieved informational data about dealer rental fleet availability for a model that is the same as or similar to the machine and informational data about loaner machines availability, the computed estimated financial impact, and the distance from a location of the potential loaner machine to the customer jobsite to a decision tree algorithm at the server for computing an optimal solution for maintaining customer productivity; computing, by the decision tree algorithm, the optimal solution for maintaining customer productivity; and notifying an entity at the network-accessible dealer site of the optimal solution, wherein the optimal solution is intended for the customer.

DETAILED DESCRIPTION

The present disclosure relates to machine maintenance (e.g., industrial machine maintenance), and more specifically, to systems and methods for collecting data from sensors and other relevant sources and, in response to a machine failure, calculating an optimal solution in real-time using the collected data.

Figure 1:
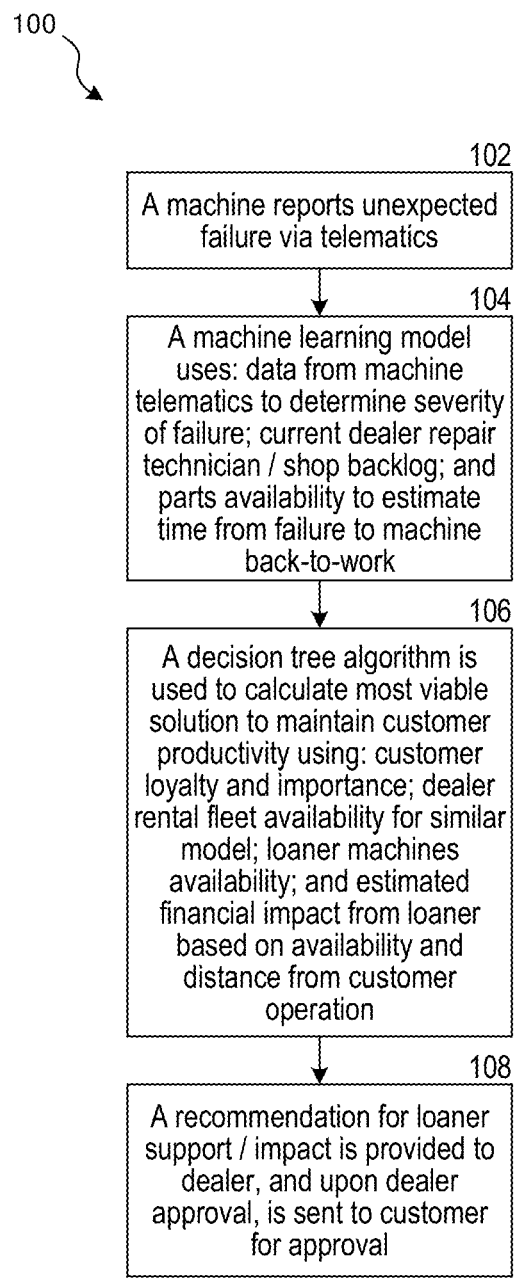
FIG. 1 is a flow diagram showing a high level method for generating and providing a solution to an unexpected machine failure according to some embodiments of the disclosed technology.

The disclosed innovation may be understood with reference to FIG. 1, a flow diagram 100 showing a high level method for generating and providing a solution to an unexpected machine failure according to some embodiments of the disclosed technology.

At step 102, a machine (e.g., a type of heavy machinery, a vehicle, a type of construction equipment, and those belonging to a fleet of machines) determines and reports an unexpected failure, e.g., via telematics sensor data. Telematics and/or telematics sensor data refers to single or aggregation of readings from different instrumentation that is included as part of the original equipment. Such readings are stored and might be transmitted via satellite, cell-phone, wi-fi networks or other means to allow for analysis from the original equipment manufacturer (OEM). As an example, a tractor on a jobsite may be embedded with one or more sensors where the one or more sensors are programmed to detect a machine failure of the tractor. For instance, one of the tractor's sensors detects a temperature that is higher than an acceptable threshold and sends a control signal to an operating processor embedded in the tractor, the control signal instructing the tractor to stop, e.g., the control signal determining and transmitting a specific failure event code to the operating processor. Also, before, subsequent to, or parallel to the process of stopping the tractor, the sensor transmits the sensor data (e.g., reports the telematics sensor data) to a network-accessible server, e.g., that is administrated by a company or other entity that provides the tractor and/or the tractor-related service or is otherwise associated with the tractor and/or the tractor-related service, e.g., a third-party entity that handles the telematics aspects of the disclosed innovation. An example of such entity is the provider of equipment such as industrial machines, Caterpillar, INC.

At step 104, a machine learning model, embedded in the server uses: data that was transmitted using machine telematics to determine the severity of failure; data reflecting the current dealer repair technician and/or shop backlog; and data reflecting the parts availability, to estimate the time from the failure to when the machine can get back to work. As an example, in response to the server receiving the transmitted telematics data from the machine reporting an unexpected failure, the server also obtains data from a dealer database about whether the dealer has a technician available to work on the machine and/or how long until the technician is available, and provides such data as input to the machine learning model. The server also obtains data from the dealer database about parts availability, e.g., whether the part for repair available at the dealer or distribution center, and provides such data as input to the machine learning model. The server also obtains data from the dealer database about shop availability, e.g., whether the shop is fully occupied, and provides such data as input to the machine learning model. From the telematics sensor data, the server also obtains data reflecting a specific critical failure that required the machine to stop and provides such data as input to the machine learning model. Having received the above-described input data, the machine learning model calculates an estimate of the time to when the machine will be back up, working or, alternatively, the time that the machine is in repair.

At step 106, a decision tree algorithm is used to calculate a most viable solution to maintain customer productivity using: customer loyalty and importance; dealer rental fleet availability for similar model; loaner machines availability; and estimated financial impact from loaner based on availability and distance from customer operation. A dealer rental fleet is the collection of machines a dealer (e.g., Caterpillar) makes available for any customer to rent; loaner machines can be new or used equipment that is not part of the dealer rental fleet but the dealer makes it available to support customers An example of a financial impact calculation is that if a customer job location is closer to a certain Caterpillar dealer branch that has a smaller model vs. the unit that failed, the small unit might be able to perform the job slower but be more effective than waiting longer for a like-for-like replacement that will take more days/hours to reach customer location. As another example, the decision tree algorithm resides on the server and receives as input from the dealer database: a specific discount rental rate based on the specific customer loyalty status with the dealer and that the dealer has a similar model of the stopped machine that is available for rental. A calculating processor, such as the machine learning model or another machine learning model, calculates one or more intermediate values such as the cost and estimated financial impact of renting a loaner machine, where the cost and estimated financial impact include that the dealership is a few miles from the jobsite. The decision tree algorithm also takes the cost and estimated financial impact as input. Further, the decision tree algorithm is configured to compute available options for the customer. For instance, a customer may be considered small so that such customer does not access to renting other vehicles or machines from the entity's fleet. Then, based on the three above-mentioned inputs, the decision tree algorithm outputs the most viable solution to maintain customer productivity, e.g., suggests renting the machine from the dealership.

At step 108, a recommendation by the decision tree algorithm for loaner support and/or the estimated financial impact is provided to the dealer, and upon dealer approval, is sent to the customer for approval. As an example, the machine learning model with the decision tree algorithm outputs, e.g., via an online notification or report, a recommendation for the customer to rent one of the available machines at the dealer, along with the estimate financial impact of the customer renting such machine. At the dealership site, one of the dealers receives the notification, reviews the notification or as an assigned dealer review the notification. Upon approving the notification, the dealer approving the notification sends, e.g., via email or via text, the notification to the customer for approval by the customer.

Figure 2:
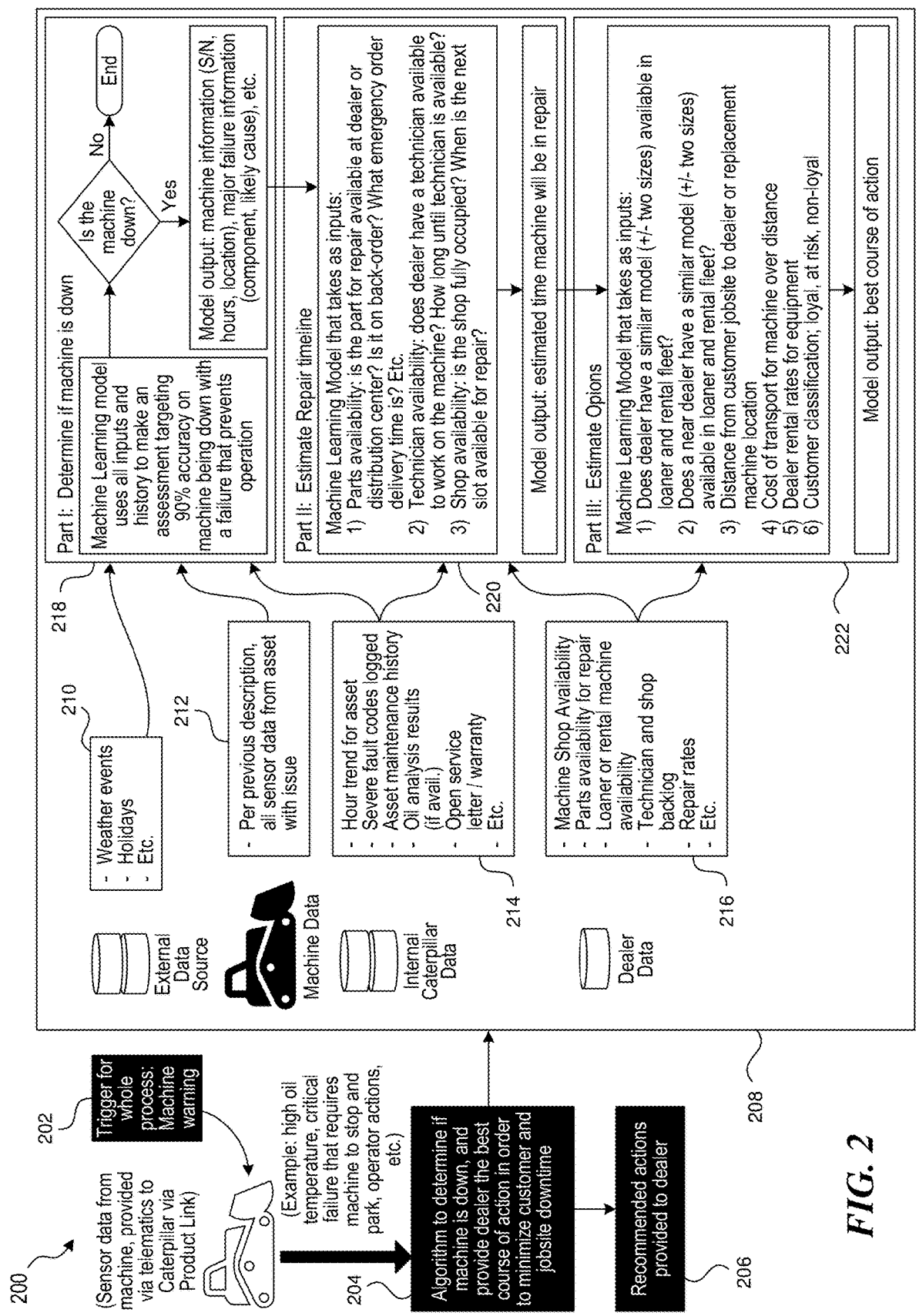
FIG. 2, a schematic diagram 200 showing the process from detecting an unexpected machine failure to calculated best course of action according to some embodiments of the disclosed technology.

The disclosed innovation may be understood with reference to FIG. 2, a schematic diagram 200 showing the process from detecting an unexpected machine failure to a best course of action according to some embodiments of the disclosed technology.

At step 202, the process is triggered by a machine warning. More specifically, sensor data from the machine is provided via telematics over a network to an entity managing the machine, e.g., an entity that provides the machine and/or the machine-related service or is otherwise associated with the machine and/or the machine-related service, such as CAT. In an embodiment, the sensor data is telematics sensor data, which includes data from sensors embedded in the machine itself such as but not limited to GPS data, engine-related data, driver behavior data, and activity-related data by the machine. In an embodiment, the sensor data is transmitted to the entity managing the machine over a network-accessible product link, which is a specific online link based on the type of product that is the machine. For instance, if the machine is a tractor, then the product link will land at a site at the entity having to do with tractors. As an example, one of the sensors on the machine measures and detects that the temperature of the oil is higher than a pre-determined threshold, causing the machine to stop operation. As another example, one of the operator-behavior-related sensors measures and detects that the operator is driving erratically, which may indicate that the operator has been drinking alcohol, causing the machine to stop operation. In an embodiment, machines have set thresholds for normal and abnormal operation. Such thresholds can be single or a combination of several events. As an example, if a machine is reporting a high engine temperature and a coiling system failure, the system will provide an audible alarm and alert operator to stop and park the machine on a safe place. As another example, if the machine is detecting abnormal inputs as compared to normal operation and detecting no weight on the operator seat, it will similarly signal a failure or issue and alert operator to stop the equipment as soon as possible. In an embodiment, a product link report or a machine status report is transmitted from the machine to the entity (e.g., to a CAT product link server). Such reports are the data sources reporting a grave failure that causes the innovative process to trigger the evaluation service. In an embodiment, such reports are transmitted or pushed to the product link server on a predetermined regular basis or periodically. In an embodiment, such reports are pulled from the product link server.

At step 204, the machine data is transmitted to a server at or managed by the entity that manages the machine and/or machine-related service. Such data is provided as input to a machine learning model(s) and/or algorithm(s) residing on the server. It should be appreciated that the disclosure may use machine learning model and algorithm interchangeably. In some embodiments, the machine learning model is an artificial intelligence model, a neural network, a statistical regression model, a time-to-event model, a Naïve Bayes model, a decision tree, a clustering model, a gradient boosting model, a random forest model, a deep learning model, a dimensionality reduction model, a rule system model, a regularization model, an ensemble model, and any other suitable mathematical model, and/or a combination thereof. While the disclosure may refer to one machine learning model or one algorithm, it is appreciated that the implementation of such model or algorithm may include more than one. For instance, an intermediate calculation may be performed by a different processor at the server or at a different remote site, such as on the internet cloud. In an embodiment, the machine learning model also takes as input data from external sources, such as but not limited to weather or seasonal events and holidays, and from data internal to the entity (e.g., Internal CAT data), such as but not limited to machine historical data. In an embodiment, a processor at the entity's server evaluates multiple reported sensor data points before initiating the machine learning model process. For example, the machine and the server are configured to transmit and receive, respectively, five data points from each of the sensors on the machine before activating the machine learning model. In an embodiment, the average of the given data points for each sensor are provided as the input to the machine learning model. In an embodiment, the machine learning model ingests the whole data and calculates various statistics metrics itself. That is, the innovation might not provide the machine learning model averages, but the data points.

At step 206, the machine learning model processes the input data described in step 204 and outputs recommended actions, e.g., wait until the technician comes and replaces a part, that are provided to the dealer, e.g., via a screen display of an associated application. In an embodiment, the output is a series of recommendations, ranked from most effective to least effective. The output is also provided via a signal to another system, for example if a solution requires to reserve an equipment for the customer for 1 week, the system can perform that operation once the solution is confirmed.

At step 208, the details of the process of the machine learning model are shown.

At step 218, the machine learning model determines in the machine at the jobsite is down or has stopped. The machine learning model uses inputs (e.g., telematic, from external data sources, and from the entity's internal storages) and history to make an assessment targeting 90% accuracy on the machine being down with a failure that prevents operation. It should be appreciated that the decision to make the assessment targeting 90% accuracy was made based on performance of previous algorithms. It is normal for a Caterpillar dealer to have >1,000 machines operating in any given day in their respective territories. If 200 of those have issues, a 90% accuracy means that 20 (10%) are "false positives" which the innovation is configured to keep to a minimum. However, it further should be appreciated that other ranges can be acceptable depending on equipment and fleet sizes. Currently machines do not have a system to tell if they are inoperable, thus, the innovation infers this informational data from sensor data. When the machine learning model determines that the machine is not down, the process ends. When the machine learning model determines that the machine is down, the model outputs the following data: machine information (e.g., the unique machine identifier such as the serial number (S/N)), hour meter or hours machine has operated since put into service, location, major failure information (component, likely cause), etc. Examples of components include but are not limited to an engine, transmission, a powertrain (and/or one or more components thereof), a drivetrain (and/or one or more components thereof), one or more shafts (e.g., driveshaft, axle shaft, etc.), one or more joints (e.g., CV joints, U-joints, etc.). Further examples include but are not limited to hydraulic components such as pumps, motors, torque converter, valve banks; electronic devices such as inertial measuring units, accelerometer, level sensor; and final drives and electric drive components (e.g., inverter, generator, motor).

At step 210, data from an external data source are provided as input to step 218 and, more specifically, to the machine learning model. Example data provided by the external data source may include but are not limited to weather events and holidays. For instance, a weather event can be that the current temperature is below freezing or thirty degrees hotter than the average for a given day. An example of holiday data can indicate that a given day is a holiday and that some dealer shops may be closed. The external data source may be more than one source. For example, the weather events may be transmitted by a meteorological site and a holiday schedule may be transmitted by a federal or state holiday data source. Other examples may include federal disaster declarations or other events that impact business (e.g., fire, flooding, etc.).

At step 212, data from the machine sensors are provided as input to step 218 and, more specifically, to the machine learning model. As described above, examples of machine sensor data may include but are not limited to GPS data, engine-related data, driver behavior data, and activity-related data by the machine. In an embodiment, such sensor data from the machine sensors are transmitted to the entity's server (e.g., via the product link) in the form of reports. Examples of such reports include but are not limited to a product link report and a machine status report. Such reports provide vital information from machine components, for example, historical measures for a range of engine measurements such as air intake, engine oil, and exhaust temperatures, pressure, oxygen quantity, among others. As mentioned above, each main component of the machine provides a set of those measurements, and in the aggregate provide a very accurate picture of machine performance and possible issues or parameters outside what is considered normal operating range. In another embodiment, the sensors on the machine or a computing processor on the machine are configured to transmit data or aggregate data to the product link server which hosts the machine learning model.

At step 214, data from the entity's internal data store are provided as input to step 218 and, more specifically, to the machine learning model. Such data may include but are not limited to: hour trend for asset; severe fault or error codes logged for asset; asset maintenance history; oil analysis results if available; and an open service letter and/or warranty. With regard to hour trend for asset, in an embodiment, machine operating hours are provided to the machine learning model so that such data allows the model to calculate various measurements including usage trends over a large period of time; the model then determines, based on historical data, if an occurrence of low to no usage constitutes normal (for example: Weekends or Holidays) or abnormal and therefore needs to be flagged or refined to determine if equipment is down. With regard to error codes, as an example one error code might originate from high normal engine oil temperature, as determined by a combination of engine oil temperature sensor, air inlet, and air exhaust sensors. If the temperature indicated in the oil sensor remains high, with confirmation from abnormal high exhaust temperature, and the air inlet sensor does not report high air intake temperatures, the machine control module determines a fault is present and provides a severe fault code that requires immediate action in order to prevent severe damage to the engine. In another example, a pump and hydraulic pressure sensor might detect a dramatic drop in system pressure without any command provided by the operator, and after a certain time elapsed, determine there is likely a leak in the hydraulic system. This error would also activate a severe alarm that requires the equipment to stop operating to prevent further damages to the components.

Thus, in an embodiment, the machine learning model in step 218 receives input from steps 210, 212, and 214 as described above. The machine learning model processes such input and when the machine learning model computes that the machine is down, the machine learning model further computes output as described above. In an embodiment, the machine learning model is configured to score each of the input to determine the machine information and the major failure information. In an embodiment, the internal data is scored from non-significant (that is, low probability to cause an equipment to fail) to highly significant (high probability to cause equipment downtime) individually. This process applies even to external data sources such as holidays and weather. For instance, a holiday would certainly cause the machine not to be utilized so such data is highly significant. After individually classifying each data input, the system then calculates the possible combinations of such events to provide a final score and calculation of equipment down status. For instance, one equipment can demonstrate a severe fault code that typically does not lead to equipment failure, but in combination with another measurement is a reliable predictor of machine down. This situation would cause the output of the ML algorithm to give a high probability of machine down, given those combined events.

In an embodiment, at step 218, the machine learning model is configured to monitor individual machine sensor information and is further configured to automatically provide a fix for a repair. In an embodiment, current and historical machine information is stored in a database, e.g., the internal CAT database. In an embodiment, machine learning model is further configured to determine the outstanding repairs that require fixing based on open service records of the machine. As an example, based on a specific open service record, the machine learning model determines that a specific part needs to be replaced. The machine learning model can be configured to send out a message with the corresponding information about the machine, the part to be replaced, and the replacement part, to an appropriate processor, which is configured to order the replacement part to be delivered to the dealer. Then, the dealer, upon receipt of the replacement part, assigns a technician to replace the old part with the new part.

In another embodiment, at step 218, the machine learning model is configured to monitor individual machine sensor information and is further configured to automatically notify the customer associated with the machine of proposed fixes (e.g., general maintenance issues) of other components of the machine. As an example, the machine learning model determines that the oil is due to be changed in one month. The machine learning model can be configured to send out a message with the corresponding information about the impending due date for the oil change to the dealer (for purposes of notifying the customer) or to the customer directly.

At step 220, in an embodiment, the machine learning model computes an estimated repair timeline. For this process, the machine learning model also takes as input the data received in step 214. Also for this process, the machine learning model takes as input the output that was generated by the process for determining if the machine is down. Also for this process, the machine learning model takes as input certain dealer data, as depicted in step 216. Such dealer data may be provided by a network-accessible remote dealer database. For example, Caterpillar has connections to dealer data systems including but not limited to rental information, stock, equipment availability, or order, etc. Examples of dealer data that are provided as input to this process may include but are not limited to machine shop availability; nearest neighboring dealer; parts availability for repair; loaner or replacement machine availability; technician and shop backlog; and repair rates. In an embodiment, the nearest dealer is determined as follows. The innovation has a dataset with dealer location for all branches including shops. In addition, the innovative system receives machine geographical location, which is configured to calculate distance to near dealer shop based on a simple Euclidian distance from where the machine is located to the nearest dealer shop repair based on circle radius. As an example regarding parts availability, the machine learning model is configured to answer: is the part for repair available at the dealer or at a distribution center? Is the part on back-order? What would be the emergency order deliver time? As an example, regarding technician availability, the machine learning model is configured to answer: does the dealer have a technician available to work on the machine? How long until technician is available? As an example, regarding shop availability, the machine learning model is configured to answer: is the shop fully occupied? When is the next slot available for a repair? Further, in accordance with embodiments herein, the machine learning algorithm runs all possible scenarios given the inputs, estimating time to repair equipment based on current constraints such as shop and technician availability, ideal time to repair if no constraints were available, availability of nearest dealer shop space and associate cost to transport machine for the distance. All scenarios are scored based individually and in combination to optimize the output for customer, dealer, and the proprietor (e.g., Caterpillar). As an example, if a critical piece of equipment fails at a certain jobsite for an important and loyal customer, the machine learning algorithm might determine the best course of action is to transport a similar machine over a long distance because such action minimizes customer downtime given the predicted machine repair time. On the opposite scenario, if a non-critical piece of equipment is down, the best course of action might be to order parts and schedule future repair time with the customer, providing an option to rent a similar piece of equipment depending on customer priority. Further, after processing such input, the machine learning model is configured to output an estimated time that the machine will be in repair. In an embodiment, the machine learning model is configured to score each of the input to determine the machine information and the major failure information.

At step 222, in an embodiment, the machine learning model computes estimated options and determines a best course of action for the customer. For this process, the machine learning model also takes as input the data received in step 216. Also for this process, the machine learning model takes as input the output that was generated by the process for computing an estimate for the repair time, as depicted in step 220. Consistent with embodiments herein, the machine learning model is configured to take as inputs: whether the dealer has a similar model (e.g., plus or minus two sizes) available in loaner and rental fleet; whether a near dealer has a similar model (e.g., plus or minus two sizes) available in loaner and rental fleet; the distance from the customer jobsite to the dealer or to the replacement machine location; the cost of transport for the machine over such distance; the dealer rental rates for the equipment; and customer classification reflecting types of benefits to receive: loyal, at risk, non-loyal. After processing such input, the machine learning model is configured to output a best course of action. As an example, a best course of action is to have a technician come to the jobsite and fix the machine by replacing a bad part with an available new part. As another example, the best course of action is to have a suitable rental machine delivered to the jobsite for purposes of completing the job and to bring the failed machine back to the dealer for intensive repairs.

Figure 3:
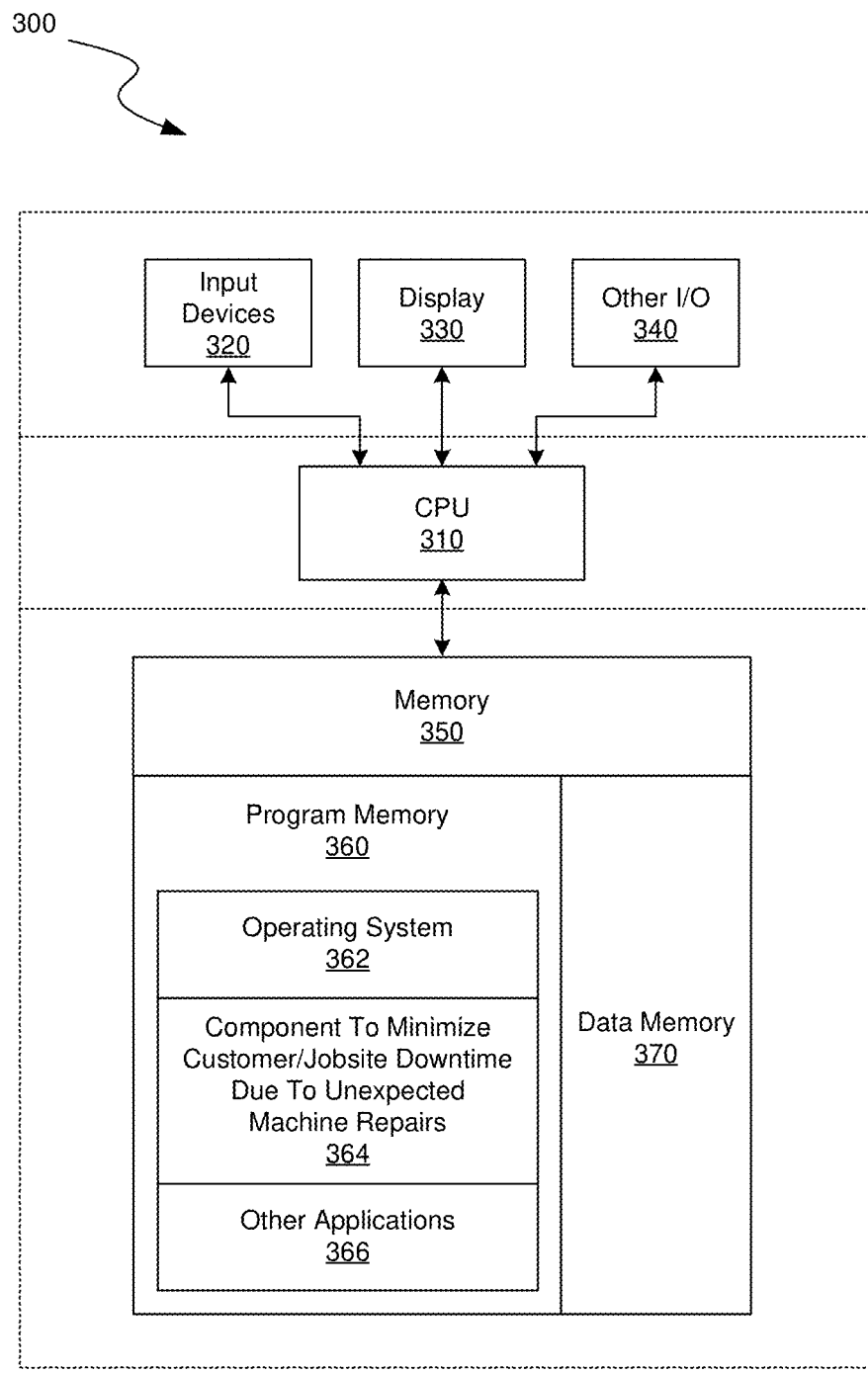
FIG. 3 is a block diagram illustrating an overview of devices on which some implementations can operate.

Several implementations are discussed below in more detail in reference to the figures. FIG. 3 is a block diagram illustrating an overview of devices on which some implementations of the disclosed technology can operate. The devices can comprise hardware components of a device 300 that computes if a machine is down and computes the best course of action, for example. Device 300 can include one or more input devices 320 that provide input to the CPU (processor) 310, notifying it of actions. The actions are typically mediated by a hardware controller that interprets the signals received from the input device and communicates the information to the CPU 310 using a communication protocol. Input devices 320 include, for example, a mouse, a keyboard, a touchscreen, an infrared sensor, a touchpad, a wearable input device, a camera- or image-based input device, a microphone, or other user input devices.

CPU 310 can be a single processing unit or multiple processing units in a device or distributed across multiple devices. CPU 310 can be coupled to other hardware devices, for example, with the use of a bus, such as a PCI bus or SCSI bus. The CPU 310 can communicate with a hardware controller for devices, such as for a display 330. Display 330 can be used to display text and graphics. In some examples, display 330 provides graphical and textual visual feedback to a user. In some implementations, display 330 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 340 can also be coupled to the processor, such as a network card, video card, audio card, USB, FireWire or other external device, sensor, camera, printer, speakers, CD-ROM drive, DVD drive, disk drive, or Blu-Ray device.

In some implementations, the device 300 also includes a communication device capable of communicating wirelessly or wire-based with a network node. The communication device can communicate with another device or a server through a network using, for example, TCP/IP protocols. Device 300 can utilize the communication device to distribute operations across multiple network devices.

The CPU 310 can have access to a memory 350. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 350 can include program memory 360 that stores programs and software, such as an operating system 362, Component Configured To Minimize Customer And Jobsite Downtime Due To Unexpected Machine Repairs 364, and other application programs 366. Memory 350 can also include data memory 370 that can include database information, etc., which can be provided to the program memory 360 or any element of the device 300.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 4:
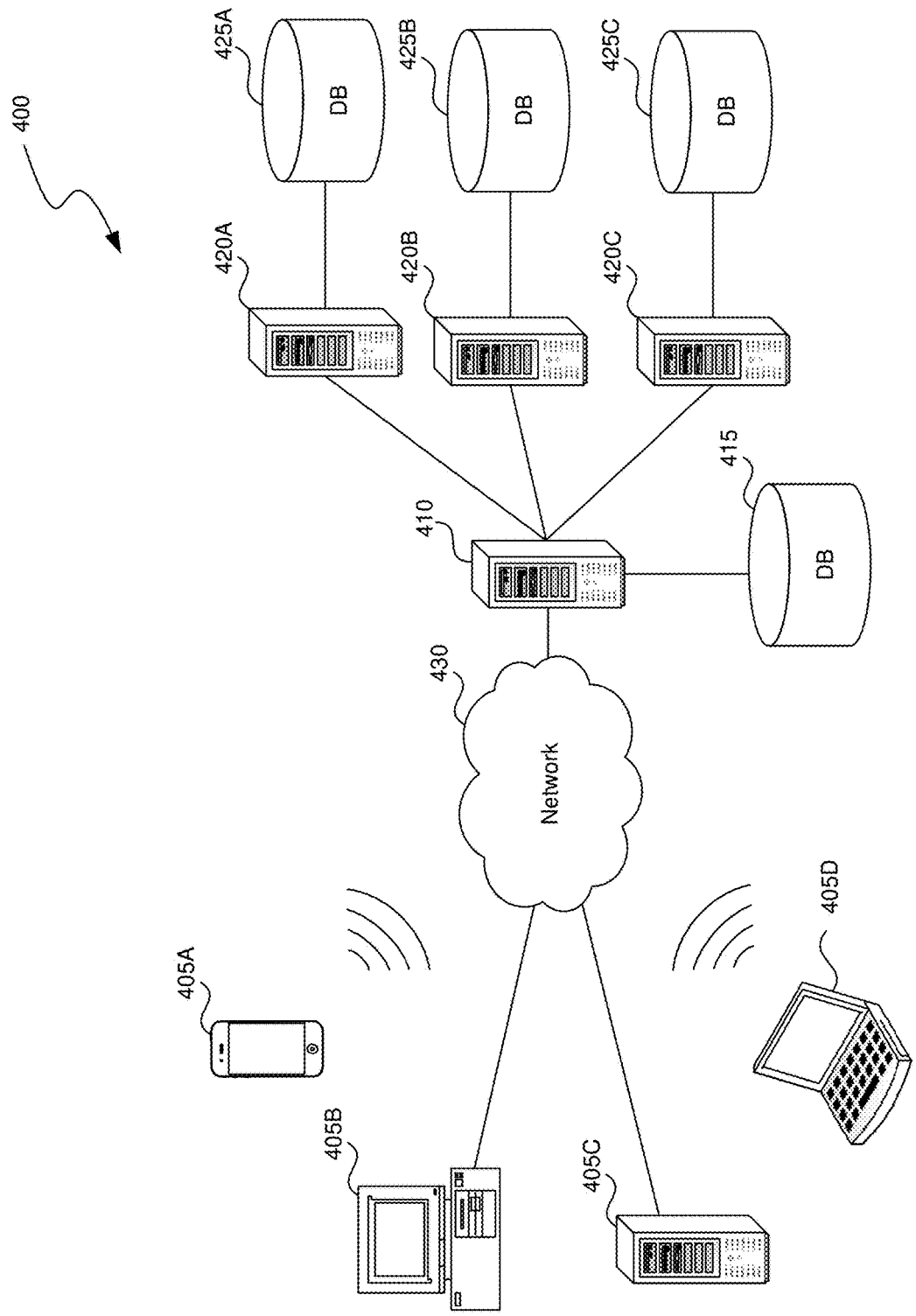
FIG. 4 is a block diagram illustrating an overview of an environment in which some implementations can operate.

FIG. 4 is a block diagram illustrating an overview of an environment 400 in which some implementations of the disclosed technology can operate. Environment 400 can include one or more client computing devices 405A-D, examples of which can include device 300. Client computing devices 405 can operate in a networked environment using logical connections through network 430 to one or more remote computers, such as a server computing device 410.

In some implementations, server computing device 410 can be an edge server that receives client requests and coordinates fulfillment of those requests through other servers, such as servers 420A-C. Server computing devices 410 and 420 can comprise computing systems, such as device 300. Though each server computing device 410 and 420 is displayed logically as a single server, server computing devices can each be a distributed computing environment encompassing multiple computing devices located at the same or at geographically disparate physical locations. In some implementations, each server computing device 420 corresponds to a group of servers.

Client computing devices 405 and server computing devices 410 and 420 can each act as a server or client to other server/client devices. Server 410 can connect to a database 415. Servers 420A-C can each connect to a corresponding database 425A-C. As discussed above, each server 420 can correspond to a group of servers, and each of these servers can share a database or can have their own database. Databases 415 and 425 can warehouse (e.g., store) information. Though databases 415 and 425 are displayed logically as single units, databases 415 and 425 can each be a distributed computing environment encompassing multiple computing devices, can be located within their corresponding server, or can be located at the same or at geographically disparate physical locations.

Network 430 can be a local area network (LAN) or a wide area network (WAN), but can also be other wired or wireless networks. Network 430 may be the Internet or some other public or private network. Client computing devices 405 can be connected to network 430 through a network interface, such as by wired or wireless communication. While the connections between server 410 and servers 420 are shown as separate connections, these connections can be any kind of local, wide area, wired, or wireless network, including network 430 or a separate public or private network.

Figure 5:
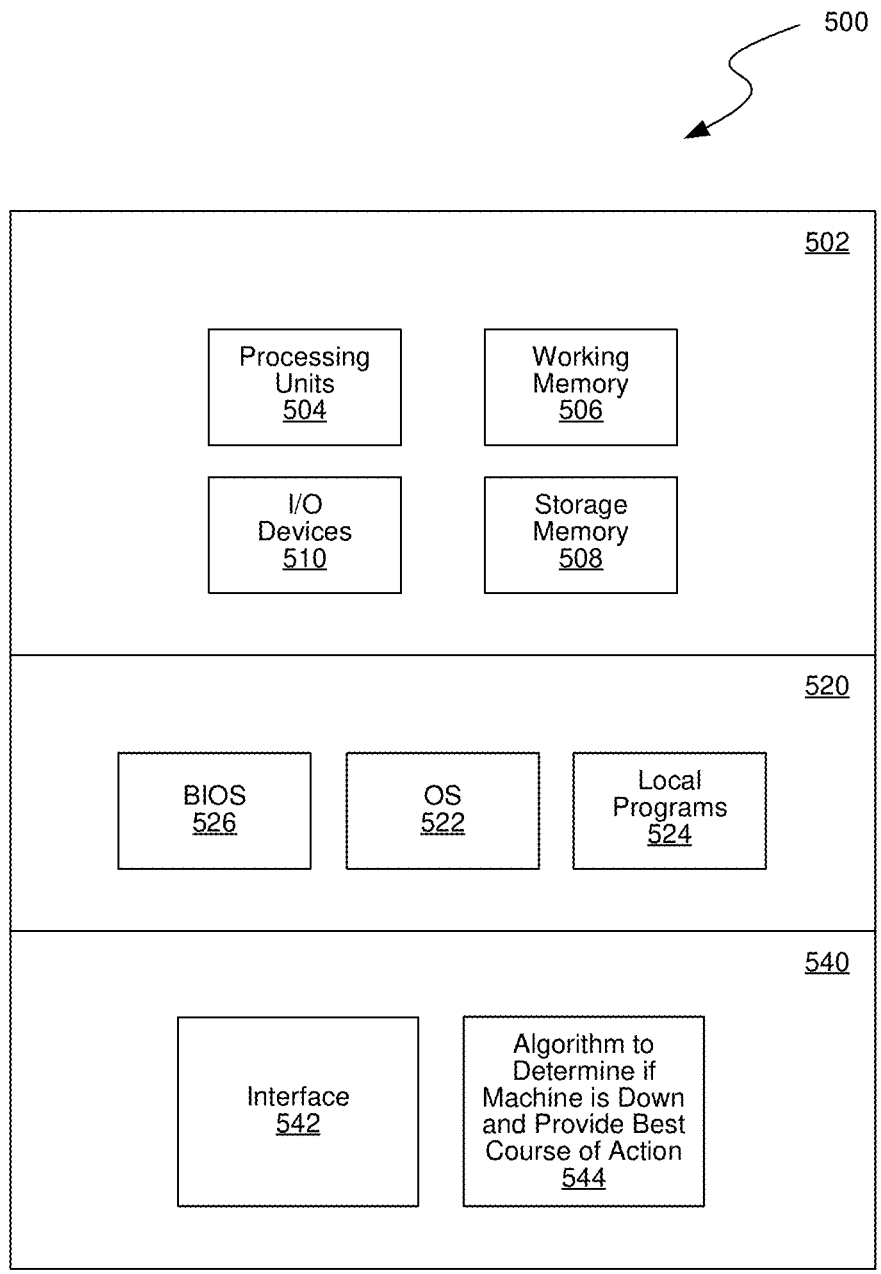
FIG. 5 is a block diagram illustrating components which, in some implementations, can be used in a system employing the disclosed technology.

FIG. 5 is a block diagram illustrating components 500 which, in some implementations, can be used in a system employing the disclosed technology. The components 500 include hardware 502, general software 520, and specialized components 540. As discussed above, a system implementing the disclosed technology can use various hardware, including processing units 504 (e.g., CPUs, GPUs, APUs, etc.), working memory 506, storage memory 508, and input and output devices 510. Components 500 can be implemented in a client computing device such as client computing devices 805 or on a server computing device, such as server computing device 410 or 420.

General software 520 can include various applications, including an operating system 522, local programs 524, and a basic input output system (BIOS) 526. Specialized components 540 can be subcomponents of a general software application 520, such as local programs 524. Specialized components 540 can include Algorithm To Determine If Machine Is Down and Provide Best Course Of Action 544, and components that can be used for transferring data and controlling the specialized components, such as Interface 542. In some implementations, components 500 can be in a computing system that is distributed across multiple computing devices or can be an interface to a server-based application executing one or more of specialized components 540.

Those skilled in the art will appreciate that the components illustrated in FIGS. 3-5 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

Industrial Applicability

The industrial applicability of the system and method for minimizing customer and jobsite downtime due to unexpected machine repairs will be readily appreciated from the foregoing discussion. It has been found that time can be lost in productivity when machines need repair. Thus, the innovation provides a system and method to automate the response to such unexpected machine failure.

The foregoing discussion is applicable to industrial machines or equipment such as heavy machinery, a vehicle, construction equipment, and those belonging to a fleet of machines (e.g., such machines provided by Caterpillar, INC). Such machinery typically is employed at a customer site or a jobsite. Each such machine is previously embedded with sensors 200 that monitor machine-related data and/or actions, such as but not limited to sensors that monitor oil temperature and certain actions of the operator of the machine (e.g., if the operator is operating the vehicle in an erratic way by performing operations that too quickly or out of a typical order). The sensors are configured to detect when certain data overcomes certain pre-determined thresholds and to report such data via a product link to a server (204, 208, 218, 220).

The server hosts one or more processors that are configured with programmed machine learning models that perform certain tasks (218, 220, 222). As discussed above, the programmed machine learning models take various inputs from the machine 212 (e.g., oil temperature), from external sources 210 (e.g., the current weather temperature), and from internal sources 214 (e.g., stored historical data about the machine or about the customer employing the machine). The machine sensor data can be transmitted to the server on a periodic basis or when a grave failure has occurred on the machine. In an embodiment, the server evaluates multiple reported sensor data points before initiating the specific operations (218, 220, 222) of the machine learning models to evaluate the grave failure and derive output that reflects a best course of action for the customer 222.

Once the programmed machine learning models (218, 220, 222) are initiated, they compute whether the machine is down 218, an estimated time to repair the machine 220, and the best course of action 222. As discussed above, a unique variety of different input (e.g., 210, 212, 214, and 216) is provided to the machine learning models for such models to generate the best course of action for the customer 222. Examples of such input include but are not limited to the parts availability, technician availability, shop availability, whether dealer has the same machine or a similar model available, does a nearby dealer have the same machine or a similar model available, the distance from the customer jobsite to the dealer or to a replacement machine location, the cost of transport for the machine over the distance, the dealer rental rates for the equipment, and the customer classification, such as loyal, at risk, or non-loyal.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in an embodiment" (or the like) in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

As used herein, the term "and/or" when used in the phrase "A and/or B" means "A, or B, or both A and B." A similar manner of interpretation applies to the term "and/or" when used in a list of more than two terms.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A computer-implemented method for inferring machine failure, estimating when the machine will be repaired, and computing an optimal solution, the method comprising:

receiving, at a server processor and from the machine at a customer jobsite of a customer, sensor data from a plurality of sensors of the machine, comprising at least: an oil sensor of an engine, an air inlet sensor of the engine, and an air exhaust sensor of the engine;

receiving, at the server processor, a combination of measurements representing a predetermined number of data points from each of the plurality of sensors indicating that a temperature of the oil sensor remains high, relative to normal operation, over the predetermined number of data points, as confirmed by a high exhaust temperature received from the air exhaust sensor, and as further confirmed by the air inlet sensor not reporting high air intake temperatures;

upon reaching the predetermined number of data points from each of the plurality of machine sensors, activating, by the server processor, a first machine learning model to execute operations comprising:

assessing, based on performance of previous machine learning algorithms, an accuracy threshold inversely proportional to a measure of false positive machine failure events;

inferring from the accuracy threshold, and based on the predetermined number of the data points received from combined measurements of the oil sensor, the air inlet sensor, and the air exhaust sensor, that the machine experienced the machine failure; and generating, based on the inferring, an indication of a failed part of the machine; and upon generating the indication of the failed part of the machine, performing, by the server processor, subsequent operations comprising:
  inputting the received sensor data and additional informational data received from a network-accessible dealer site to a second machine learning model, wherein the second machine learning model computes an estimated time to when the machine will be repaired;
  computing an estimated financial impact from a potential loaner machine, based on availability of said potential loaner machine;
  determining a distance from a location of the potential loaner machine to the customer jobsite;
    computing the optimal solution for maintaining customer productivity by using the estimated financial impact, the determined distance and the estimated time to when the failed machine will be repaired; and
  notifying an entity at the network-accessible dealer site of the optimal solution, wherein the optimal solution is intended for the customer.

2. The method of claim 1, further comprising:
receiving, at the server processor and from the machine at the customer jobsite of the customer, a plurality of additional sensor data points; and
evaluating, by the server processor, the plurality of additional sensor data points before inputting the evaluated plurality of sensor data to the second machine learning model f or computing the estimated time to when the failed machine will be repaired.

3. The method of claim 1, wherein the sensor data is associated with a product link report or a machine status report and wherein the product link report or the machine status report indicates the machine failure.

4. The method of claim 1, wherein the sensor data further comprises at least one error code and actual hours that the machine has been in operation and wherein the at least one error code indicates the machine failure.

5. The method of claim 1, further comprising:
determining, by the server processor, a nearby dealer shop, wherein the nearby dealer shop is different from a dealer associated with the customer;
determining, by the server processor, a particular distance from a location of the nearby dealer shop to the customer jobsite; and
utilizing the particular distance from the location of the nearby dealer shop to the customer jobsite to compute the optimal solution for maintaining customer productivity.

6. The method of claim 1, further comprising:
retrieving, at the server processor and from a database storing historical and current machine information, machine informational data;
retrieving, at the server processor and from an external source, informational data about a mandatory repair of the machine; and
automatically causing the machine to be repaired in accordance with the mandatory repair.

7. The method of claim 1, further comprising:
retrieving, at the server processor and from a database storing historical and current machine information, machine informational data;
retrieving, at the server processor and from an external source, informational data about maintenance of a component of the machine; and
automatically notifying the customer of a proposal to address the maintenance of the component.

8. One or more non-transitory, computer-readable storage media having instructions stored thereon that, when executed by at least one processor, cause the at least one processor to perform operations for inferring machine failure, estimating when the machine will be repaired, and computing an optimal solution, the operations comprising:
receiving, at the at least one processor and from the machine at a customer jobsite of a customer, sensor data from a plurality of sensors of the machine, comprising at least: an oil sensor of an engine, an air inlet sensor of the engine, and an air exhaust sensor of the engine;
receiving, at the at least one processor, a combination of measurements representing a predetermined number of data points from each of the plurality of sensors indicating that a temperature of the oil sensor remains high, relative to normal operation, over the predetermined number of data points, as confirmed by a high exhaust temperature received from the air exhaust sensor, and as further confirmed by the air inlet sensor not reporting high air intake temperatures;
upon reaching the predetermined number of data points from each of the plurality of machine sensors, activating, by the at least one processor, a first machine learning model to execute operations comprising:
  assessing, based on performance of previous machine learning algorithms, an accuracy threshold inversely proportional to a measure of false positive machine failure events;
  inferring from the accuracy threshold, and based on the predetermined number of the data points received from combined measurements of the oil sensor, the air inlet sensor, and the air exhaust sensor, that the machine experienced the machine failure; and
  generating, based on the inferring, an indication of a failed part of the machine; and
upon generating the indication of the failed part of the machine, performing, by the at least one processor, subsequent operations comprising:
  inputting the received sensor data and additional informational data received from a network-accessible dealer site to a second machine learning model, wherein the second machine learning model computes an estimated time to when the machine will be repaired;
  computing an estimated financial impact from a potential loaner machine, based on availability of said potential loaner machine;
  determining a distance from a location of the potential loaner machine to the customer jobsite;
    computing the optimal solution for maintaining customer productivity by using the estimated financial impact, the determined distance and the estimated time to when the failed machine will be repaired; and
  notifying an entity at the network-accessible dealer site of the optimal solution, wherein the optimal solution is intended for the customer.

9. The one or more non-transitory computer readable storage media of claim 8, the operations further comprising:

receiving, at the at least one processor and from the machine at the customer jobsite of the customer, a plurality of additional sensor data points; and evaluating, by the at least one processor, the plurality of additional sensor data points before inputting the evaluated plurality of sensor data to the second machine learning model for computing the estimated time to when the failed machine will be repaired.

10. The one or more non-transitory computer readable storage media of claim 8, wherein the sensor data is associated with a product link report or a machine status report and wherein the product link report or the machine status report indicates the machine failure.

11. The one or more non-transitory computer readable storage media of claim 8, wherein the sensor data further comprises at least one error code and actual hours that the machine has been in operation and wherein the at least one error code indicates the machine failure.

12. The one or more non-transitory computer readable storage media of claim 8, the operations further comprising:
   determining, by the at least one processor, a nearby dealer shop, wherein the nearby dealer shop is different from a dealer associated with the customer;
   determining, by the at least one processor, a particular distance from a location of the nearby dealer shop to the customer jobsite; and
   utilizing the particular distance from the location of the nearby dealer shop to the customer jobsite to compute the optimal solution for maintaining customer productivity.

13. The one or more non-transitory computer readable storage media of claim 8, the operations further comprising:
   retrieving, at the at least one processor and from a database storing historical and current machine information, machine informational data;
   retrieving, at the at least one processor and from an external source, informational data about a mandatory repair of the machine; and
   automatically causing the machine to be repaired in accordance with the mandatory repair.

14. The one or more non-transitory computer readable storage media of claim 8, the operations further comprising:
   retrieving, at the at least one processor and from a database storing historical and current machine information, machine informational data;
   retrieving, at the at least one processor and from an external source, informational data about maintenance of a component of the machine; and
   automatically notifying the customer of a proposal to address the maintenance of the component.

15. A computing system comprising at least one processor and one or more non-transitory, computer-readable media having instructions stored thereon that, when executed by the at least one processor, cause the at least one processor to perform operations for inferring machine failure, estimating when the machine will be repaired, and computing an optimal solution, the operations comprising:
   receive, at the at least one processor and from the machine at a customer jobsite of a customer, sensor data from a plurality of sensors of the machine, comprising at least: an oil sensor of an engine, an air inlet sensor of the engine, and an air exhaust sensor of the engine;
   receive, at the at least one processor, a combination of measurements representing a predetermined number of data points from each of the plurality of sensors indicating that a temperature of the oil sensor remains high, relative to normal operation, over the predetermined number of data points, as confirmed by a high exhaust temperature received from the air exhaust sensor, and as further confirmed by the air inlet sensor not reporting high air intake temperatures;
   upon reaching the predetermined number of data points from each of the plurality of machine sensors, activate, by the at least one processor, a first machine learning model to execute operations comprising:
      assess, based on performance of previous machine learning algorithms, an accuracy threshold inversely proportional to a measure of false positive machine failure events;
      infer from the accuracy threshold, and based on the predetermined number of the data points received from combined measurements of the oil sensor, the air inlet sensor, and the air exhaust sensor, that the machine experienced the machine failure; and
      generate, based on the inferring, an indication of a failed part of the machine; and
   upon generating the indication of the failed part of the machine, perform, by the at least one processor, subsequent operations comprising:
      input the received sensor data and additional informational data received from a network-accessible dealer site to a second machine learning model, wherein the second machine learning model computes an estimated time to when the machine will be repaired;
      compute an estimated financial impact from a potential loaner machine, based on availability of said potential loaner machine;
      determine a distance from a location of the potential loaner machine to the customer jobsite;
      compute the optimal solution for maintaining customer productivity by using the estimated financial impact, the determined distance and the estimated time to when the failed machine will be repaired; and
      notify an entity at the network-accessible dealer site of the optimal solution, wherein the optimal solution is intended for the customer.

16. The computing system of claim 15, the operations further comprising:
   receive, at the at least one processor and from the machine at the customer jobsite of the customer, a plurality of additional sensor data points; and
   evaluate, by the at least one processor, the plurality of additional sensor data points before inputting the evaluated plurality of sensor data to the second machine learning model for computing the estimated time to when the failed machine will be repaired.

17. The computing system of claim 15, wherein the sensor data is associated with a product link report or a machine status report and wherein the product link report or the machine status report indicates the machine failure.

18. The computing system of claim 15, wherein the sensor data further comprises at least one error code and actual hours that the machine has been in operation and wherein the at least one error code indicates the machine failure.

19. The computing system of claim 15, the operations further comprising:
   determine, by the at least one processor, a nearby dealer shop, wherein the nearby dealer shop is different from a dealer associated with the customer;
   determine, by the at least one processor, a particular distance from a location of the nearby dealer shop to the customer jobsite; and utilize the particular distance from the location of the nearby dealer shop to the customer jobsite to compute the optimal solution for maintaining customer productivity.

20. The computing system of claim 15, the operations further comprising:
retrieve, at the at least one processor and from a database storing historical and current machine information, machine informational data;
retrieve, at the at least one processor and from an external source, informational data about maintenance of a component of the machine; and
automatically notify the customer of a proposal to address the maintenance of the component.

\* \* \* \* \*